United States Patent
Miller et al.

[11] Patent Number: 6,024,126
[45] Date of Patent: Feb. 15, 2000

[54] UNIFORM CROSS-SECTION AND RIBBED THERMOPLASTIC COMPRESSOR VALVE

[75] Inventors: Ed Miller, Newark; Joy Sawyer Bloom, Wilmington, both of Del.; Charles Keller, West Chester; James Carroll, Sr., Philadelphia, both of Pa.

[73] Assignee: E. I. du Pont de Nemours and Company, Wilmington, Del.

[21] Appl. No.: 09/084,015

[22] Filed: May 26, 1998

[51] Int. Cl.⁷ ............................. F16K 15/14; F16K 15/00
[52] U.S. Cl. ..................... 137/854; 137/535; 137/540
[58] Field of Search ............................ 137/535, 540, 137/854; 251/368, 356

[56] References Cited

U.S. PATENT DOCUMENTS

| | | | |
|---|---|---|---|
| 82,670 | 9/1868 | Wilson et al. | 137/854 |
| 1,227,759 | 5/1917 | Day | 137/535 |
| 2,139,313 | 12/1938 | Neubauer | 137/854 |
| 3,085,591 | 4/1963 | Schneider | 137/854 |
| 3,620,023 | 11/1971 | Schmid | 137/854 |
| 4,368,755 | 1/1983 | King | 137/540 |
| 4,445,534 | 5/1984 | King | 137/516.27 |
| 4,789,000 | 12/1988 | Aslanian | 137/556 |
| 4,911,196 | 3/1990 | Kemp | 137/540 |
| 5,275,312 | 1/1994 | Labruzzo | 137/540 |
| 5,303,937 | 4/1994 | Huss et al. | 251/358 |
| 5,449,947 | 9/1995 | Chen et al. | 257/530 |
| 5,791,373 | 8/1998 | Adams | 137/540 |

*Primary Examiner*—Denise L. Ferensic
*Assistant Examiner*—Joanne Y. Kim
*Attorney, Agent, or Firm*—Inna Y. Belopolsky

[57] ABSTRACT

A uniform cross-section and ribbed thermoplastic compressor valve which can be used as a discharge valve for a compressor and has internal rib structure and uniform wall thickness. The valve member can be made of high-performance polymeric resin such as polyimide. The valve member comprises a base member, an annular wall member, a central member protruding from the base member, and a plurality of internal wall members. The internal wall members provide the internal rib structure which strengthens the valve member and allows for light-weight construction. Preferably, there are six internal wall members and the central member has a cavity.

41 Claims, 2 Drawing Sheets

UNIFORM CROSS-SECTION AND RIBBED THERMOPLASTIC COMPRESSOR VALVE

FIELD OF THE INVENTION

This invention relates generally to a valve member, and more particularly, to a discharge valve member having a uniform cross-section and a plurality of interior wall members which support the valve member.

BACKGROUND OF THE INVENTION

Polymeric disk-shaped valve members have many industrial applications. For example, they can be used in air conditioners, ventilators, heat pumps, and reciprocating piston type compressors including refrigeration compressors. Both single and multi-cylinder compressors employ these valve members. Compressors are used both in the home and in large scale industrial applications. In these compressors, the typical function of the discharge valve member is to be part of the valving unit which allows fluid to flow both into and out of a compressor chamber.

In a typical compressor, the valve member is exposed to demanding environments and therefore requires excellent chemical resistance, high-temperature resistance, and overall fatigue durability. The valve members are usually made of polymeric resins although metals can also be used. Although polymeric materials ("resins") are advantageously light-weight, many polymeric materials cannot survive these demanding environments. This limitation in material selection severely hampers the ability to improve the performance of these valve members.

A cross-sectional view or a conventional polymeric disk-shaped valve member used in compressors is shown in FIG. 1 together with a valve seat. This sectional view illustrates that in conventional practice the cross-sectional thickness of the valve base is not always uniform. Rather, the base thickness is greater in the middle than at the periphery. This middle bulge improves valve strength and allows stresses on the valve member to be accommodated. Such non-uniformity, however, can cause distortion during the molding and curing process so that secondary machining becomes necessary. Secondary machining is undesirable because it increases production costs. The prior art valve member of FIG. 1 is discussed below in more detail.

In addition, valve members are needed which have good sealing properties, superior mechanical and fatigue performance, and also light weight. Light weight valves are particularly important for high speed compressors where valve inertia becomes significant. The valve may be required to move in and out over 1,000 times per minute. Also, avoidins noise is important for many compressor applications.

Various prior compressors and compressor valves have been used to address certain problems and needs. For example, U.S. Pat. No. 3,508,849 is directed to a suction-discharge valve for a high pressure fluid compressor. In addition, U.S. Pat. No. 3,814,546 is directed to a seal assembly for air compressor valves which is designed to not distort. Multiple sealing rings are shown as part of a valve cage. U.S. Pat. No. 4,445,534 (and related patents, U.S. Pat. Nos. 4,478,243 and 4,368,755) is directed to a polymeric discharge valve member for use in a gas compressor. Both reed-type suction and conventional ring-type suction valve assemblies are disclosed. These patent references, however, fail to address any of the aforementioned problems and needs.

SUMMARY OF THE PRESENT INVENTION

The present invention provides improved valve members which solve problems and provide advantages noted above. For example, reduced part weight, improved dimensional tolerance, and improved flatness can be achieved. The compressor efficiency is also improved. These improvements can be traced to the valve member geometry, the valve member material, and the combination thereof.

The present invention provides a valve member for use in a compressor comprising an internal rib structure and having a uniform cross-sectional thickness throughout.

More particularly, one embodiment of the present invention provides a valve member comprising:

a base member having a top surface and a bottom surface, the base member having a substantially uniform thickness between the top and bottom surfaces;

an outer wall member joined to the base member at a first joint region, the joined base and outer wall members defining an internal space;

a central member joined to the base member at a second joint region, the central member perpendicularly extending upward into the internal space; and a plurality of internal wall members disposed between the central member and the outer wall member, each internal wall member being joined to the central member, the base member, and the outer wall member.

The invention is described below in more detail.

DETAILED DESCRIPTION OF THE PRESENT INVENTION

Figure 1:
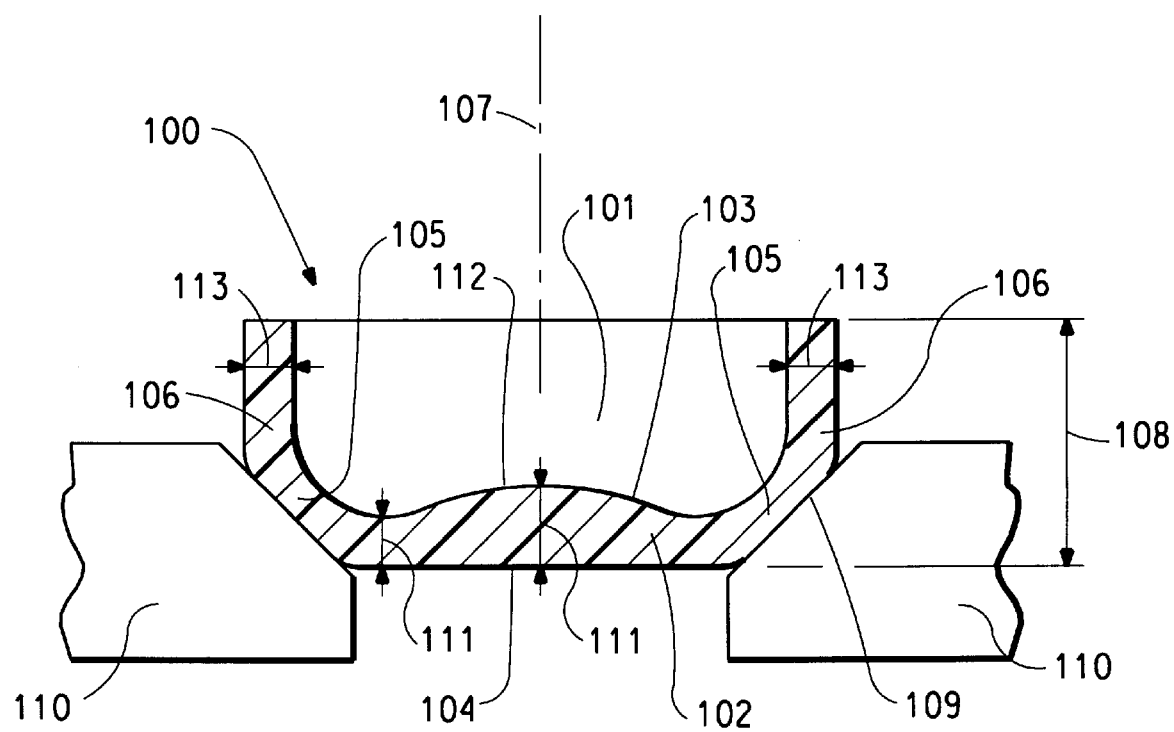
FIG. 1 illustrates a cross-sectional view of a conventional discus valve member resting on a valve seat.

As noted above, FIG. 1 illustrates a conventional discus valve. The discus valve 100 has a generally disk-like or cap-like shape enclosing an internal space 101. More specifically, the valve member is an integral, one-piece unit comprising a disk-shaped base member 102 having an upper surface 103, a bottom surface 104, and a joint region 105. An annular wall member 106 is joined to the base member 102 at the joint region 105 to define internal space 101. The base and annular wall members are approximately centered about a central axis 107. The annular wall member extends to a predetermined height 108 with respect to the bottom surface of the base member. The annular wall member and the base member join at the joint region which has both curved and linear portions. The outer surface 109 of the joint region rests on the valve seat 110. The joint region can have two linear portions in which each linear portion has a different angle with respect to the base member and the valve seat.

The base member thickness 111, which is measured between the bottom surface 104 and an upper surface 103, is not uniform. Rather, a bulge 112 appears at the upper surface so that the upper surface and the bottom surface are not coplanar. The peak of this bulge is generally at about the central axis 107. The bottom surface generally remains substantially flat. The annular wall member also has a thickness, 113. The annular wall member thickness and the base member thickness are not generally the same. Moreover, there is no internal rib structure to support the annular wall member thickness.

The conventional discus valve of FIG. 1 is generally an integral piece. In making this integral piece, particles of polymer resin can be compression molded to form integrated resin.

Figure 2A:
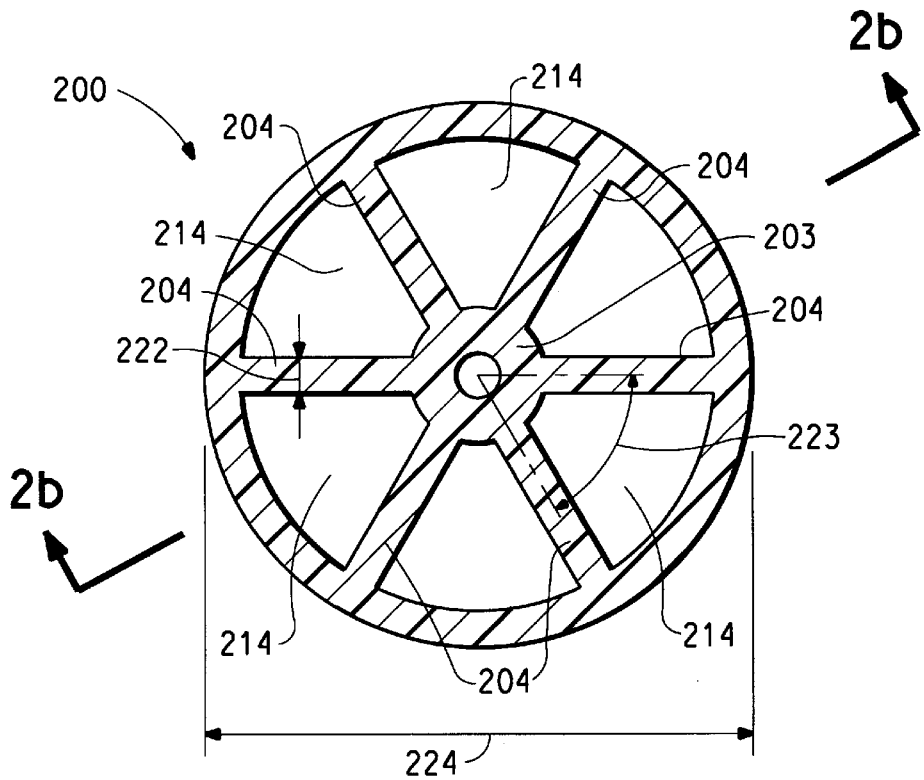
FIGS. 2(a) and 2(b) illustrate frontal and cross-sectional views, respectively, of a preferred embodiment of the present invention.
Figure 2B:
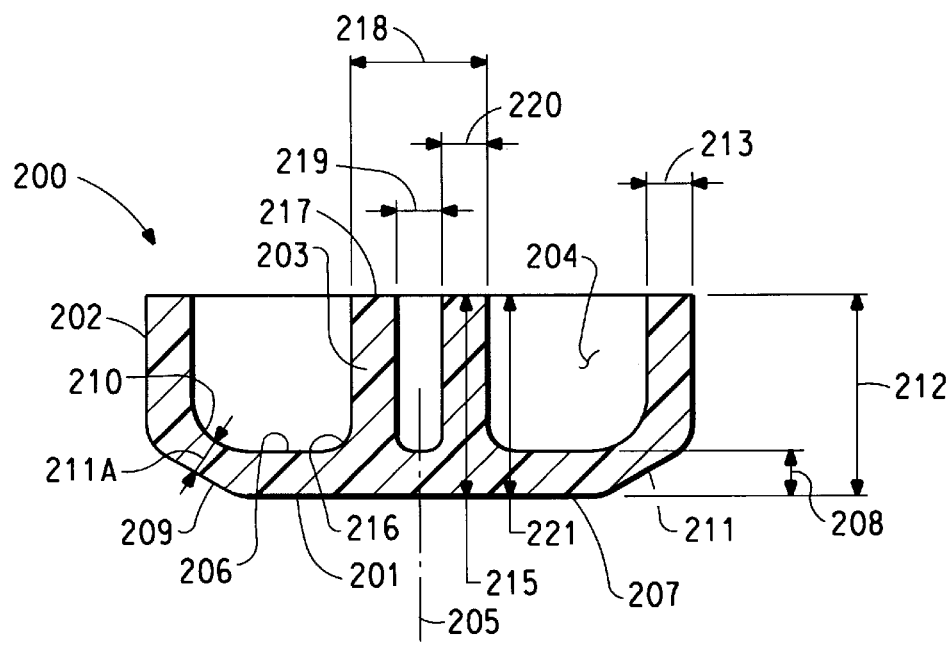

With reference to FIGS. 2(a) and 2(b), top and cross-sectional views are shown, respectively, of a preferred embodiment of the valve member according to the present invention. The cross-sectional view in FIG. 2(b) is taken along the A—A plane in FIG. 2(a). In this embodiment, the valve member appears substantially circular when viewed from the top view of FIG. 2(a).

With reference to FIGS. 2(a) and 2(b), valve member 200, although a single integral piece of material, comprises various joined member parts which include a base member 201, an outer annular wall member 202, a central member 203, and a plurality of inner wall members 204. FIG. 2(a) illustrates the preferred embodiment in which there are six interior wall members which are interior with respect to the outer annular wall member 202. Although six internal wall members are shown, it is to be understood that two or more internal wall members can be used in accordance with the present invention. These members are preferably centered around a central axis 205. This central axis runs perpendicular to the plane of the paper in FIG. 2(a). In combination, these members function together and integrally join to form the valve member 200 according to the present invention. Each of these members 201–204 will now be discussed in greater detail.

The base member 201 has a top surface 206 and a bottom surface 207. In this embodiment, the top and bottom surfaces are substantially perpendicular to and disposed around the central axis 205 although it is to be understood that the central member 203 protrudes from the top surface. In this embodiment, the top and bottom surfaces are substantially coplanar except for the protruding central member, and the bottom surface preferably is substantially flat.

The coplanar portions of the top and bottom surfaces can be characterized by a base thickness 208. In stark contrast to the conventional discus valve of FIG. 1, the base thickness 208 of the valve member of the present invention is substantially uniform. Preferably, the base thickness is completely uniform. In a preferred embodiment, the base thickness is about 0.1 inch (2.54 mm) although it is to be understood that other thicknesses may be used.

Preferably, the peripheral edge of the base region should be substantially circular to maximize the strength of the valve member under conditions of repeated mechanical fatigue. The base member also can be shaped to allow for a bias force to be applied. This bias force can be applied by, for example, a spring.

The base member 201 is joined to an outer annular wall member 202 at a first joint region 209. This joint region has an upper surface 210 and a bottom surface 211. The bottom surface of the joint region is designed to rest on a valve seat. This bottom surface must be free from mold and/or machining marks.

In one example, the bottom surface of the joint region can have a flat, linear portion which will push against a linear valve seat. When the valve member is not compressed, the linear portion of the joint region does not need to be inclined at the same angle as the angle of the valve seat. Rather, a gap can exist which will at least partially disappear when the valve member is compressed.

Also, the bottom surface can have two different linear portions, each of which have a slightly different angle of inclination.

The outer annular wall member, together with the joint region, is also centered about the central axis 205. The thickness at the joint region 211A can be about 0.1 inch (2.54 mm) although it is to be understood that other dimensions may be used. The thickness of the joint region may vary slightly from the base member end to the outer wall member end of the joint region.

The outer annular wall member linearly extends upward to a predetermined height 212 with respect to the bottom of the base member. This height can be, for example, about 0.30 inches (7.6 mm) to about 0.40 inches (10.2 mm), although it is to be understood that other heights can be used. In one embodiment, it can be about 0.3675 inches (9.33 mm). The annular wall member is preferably roughly perpendicular relative to the disk-shaped base member.

The thickness of the annular wall 213, like the base thickness, preferably is substantially uniform. The annular wall member thicknesses is preferably about the same as the base member thickness as this helps relieve stresses. In a preferred embodiment, the annular wall thickness is about 0.10 inch (2.54 mm), although it is to be understood that other thicknesses may be used.

The base and annular wall members define an internal space 214 which is surrounded by the base and annular wall members. This internal space is subdivided by the internal wall members and the central member as discussed further below.

A central member 203 is joined to the top surface of the base member and protrudes into the internal space 214 to a predetermined height 215 with respect to the bottom of the base member. This height can be, for example, from about 0.30 inches (7.62 mm) to about 0.40 inches (10.2 mm), although it is to be understood that other heights can be used. In one embodiment, this height is 0.3675 inches (9.33 mm). Preferably, the predetermined heights of the central member and the annular wall member are about the same.

The region at which the central member 203 and the base member 201 join, 216, preferably has some but not extensive curvature, and the region is centered about the central axis.

The central member is centered about the central axis, and preferably, is perpendicular to the top surface. Although the central member can be cylindrical or annular in shape, the central member is preferably annular in shape having a cavity 216 which extends from the top of the central member 217 toward the base member. This cavity is also preferably centered about the central axis and is generally shaped in the form of a cylinder. The purpose of this cavity is to reduce weight and provide the central member with an annular shape having a central member wall thickness which is about equal to the internal wall member thickness, the base thickness, and the annular wall thickness.

The width of the central member 218 is preferably about 0.35 inches (8.89 mm) to about 0.45 inches (11.4 mm), although it is to be understood that other widths are possible. In one embodiment, the width is about 0.41 inches (10.4 mm).

When the cavity 216 is present in the central member, the cavity preferably has a width 219 of about 0.20 inches (5.08 mm) to about 0.30 inches (7.62 mm), although it is to be understood that other widths can be used. In one embodiment, the width 219 is about 0.25 inches (6.35 mm).

In one embodiment, the annular wall thickness of the central member having a cavity, 220, is about 0.080 inches (2.0 mm), although it is to be understood that other thicknesses can be used.

Finally, a plurality of internal wall members 204 (or ribs) are disposed within the internal space between the central member and the annular wall member. These internal wall members preferably structurally connect the annular wall member 202 to the central member 203 and divide the internal space into a plurality of internal cavities. For example, if there are two internal wall members, then there will be two internal cavities. For three wall members, there will be three internal cavities. If there are six wall members, there will be six internal cavities.

The internal wall members extend upwardly to a predetermined height 221 with respect to the bottom surface of the base region. Preferably, the internal wall member height is about the same as the annular wall member height and the central member height. This height 221 can be, for example, about 0.30 inches (7.62 mm) to about 0.40 inches (10.2 mm), although it is to be understood that other heights can be used. In one embodiment, the height is about 0.3675 inches (9.3 mm).

In addition, the internal walls, which each preferably have a roughly rectangular shape, have an internal wall thickness 222. Preferably, each of the internal wall thicknesses for each internal wall member are about the same. This thickness can be, for example, about 0.080 inches (2.0 mm), although it is to be understood that the thickness can vary. The internal wall thickness 222 can be equal to or, alternatively, approximately 60–70% less than the base member thickness 208 or the annular wall 213. The suitable thickness for the internal wall can depend on the resin type, the acceptable tolerance, and the possible formation of sinks or other undesirable aesthetic features.

Each of the internal wall members are preferably symmetrically disposed about the central axis (e.g., if six internal wall members are present, then 60° separates each internal wall from each of the two adjacent internal walls).

The internal wall members, which function as stabilizing ribs and impart strength to the valve member, allow for thinner annular wall and base member thicknesses and therefore allow for reduced weight for the valve member. For example, a 50% weight reduction or more is possible with the present invention compared to a valve member which has varying thickness and is prepared by injection molding polyetheretherketone (PEEK).

Adjacent internal wall members form an internal wall member angle 223 with respect to the central axis. In order to provide maximum stabilization, the internal wall members are preferably symmetrically displaced. Hence, if there are two internal wall members, then the members are coplanar and form an internal wall member angle of 180° angle with respect to the central member. For three internal wall members, then this angle is 120°. If there are four wall members, then this angle (for any two of the internal wall members) is 90°. For five internal wall members, this angle is about 72°. If there are six internal wall members, which is a preferred embodiment, this angle is about 60°. If there are eight internal wall members, this angle is about 45°.

The size of the valve is not particularly limited, but the overall diameter 224 can be about 0.5 to about 2 inches (about 12.7 mm to about 50.8 mm). In a preferred embodiment, the diameter is about 1.5 inches (38.1 mm).

The valve member can be made of one or more high performance polymeric resins, and preferably, resins which can be molded. The invention in its broadest sense is not particularly limited by the selection of the polymeric composition so long as it shows high-performance and can be shaped. For example, the resin should have a minimum processing temperature below about 425° C., and preferably, below about 400° C. In general, the material should have high strength, high temperature resistance, relatively light weight, resistance to reaction and chemical attack, and enough compliance to seal without deformation. In particular, it should be stable to refrigerant gases and lubricants.

Resins which can be used for the valve member include polyimide, polyetherimide, polyaryletherketones, aramid, polyester, polyphenylene sulfide, and poly(amide-imide) resins, among others. Resins can be fiber reinforced with, for example, carbon or glass fiber if needed. Blends can be used if they are compatible and provide high-performance.

For example, the following materials can be used:

(a) Thermoplastic polyimide resins including those which can be obtained from Mitsui Chemicals, Inc. as AURUM® Thermoplastic Polyimide Resin under the grade numbers JCL 3030, JCL 6230, JCN 3030, JCQ 3040, JCN 6030, JCN 6530, JCN 6525, JGN 6240, and J1548;

(b) Polyetheretherketone (PEEK) including that obtained from Victrex USA in the Victrex® PEEK series, 450CA30, 150CA30, 450GL30, and 150GL30;

(c) Poly(amide imide) materials including those available from Amoco Chemicals Corp. such as the Torlon® Engineering Polymer Series, 4203L, 5030, 5430, 7130, 7233, and 7330;

(d) Aromatic polyesters including liquid crystalline materials including, for example, Zenite® LCP Liquid Crystal Polymer Resins (E.I. DuPont de Nemours & Co.) and Vectra® Liquid Crystal Polymer (Amoco Chemicals Corp.);

(e) Aromatic polyamides including, for example, Zytel® HTN, High Temperature Nylon Resin (E.I. DuPont de Nemours & Co.); and (f) polyimides such as, for example, Vespel® SP Parts And Shapes (E.I. DuPont de Nemours & Co.).

With some materials, post-annealing may be used to effect crystallization. This may help release stresses and strengthen the material.

The present invention also encompasses compressors which comprise valve members according to this invention. Full descriptions of compressors which can utilize valve members of the type disclosed herein are well-known in the art.

The valve member is used in the compressor by conventional methods. For example, conventional compressor components are used including pistons, cylinders, suction valves, manifolds, and the like. Methods known in the art can be used to assemble the compressor from its components.

The present inventive concept also applies to the method of making the valve member according to the present invention. In a preferred embodiment, this method comprises the steps of (i) filling a mold with polymeric resin pieces or powder particulate, and (ii) compression or injection molding the pieces or particulate to make an integral unit. The valve member is then removed from the mold.

In one embodiment of the present invention, secondary machining need not be carried out. Rather, the mold is shaped to provide the geometry according to the present invention without any secondary processing.

While it is apparent that the preferred embodiments of the inventions disclosed herein provide the advantages and features noted above, it should be appreciated by one of skill in the art that the invention is susceptible to modification, variation and change without departing from the proper scope or fair meaning of the following claims.

What is claimed is:

1. A valve member comprising:
a base member having a top surface and a bottom surface, the base member having a substantially uniform thickness between the top and bottom surfaces;
an outer wall member joined to the base member at a first joint region, the joined base and outer wall members defining an internal space;
a central member joined to the base member at a second joint region, the central member perpendicularly extending upward into the internal space; and
a plurality of internal wall members disposed between the central member and the outer wall member, each internal wall member being joined to the central member, the base member, and the outer wall member.

2. A valve member according to claim 1, wherein the valve member has been injection molded.

3. A valve member according to claim 1, wherein the valve member has been compression molded.

4. A valve member according to claim 1, wherein the valve member has a number of internal wall members which is selected from the group consisting of two, three, four, five, six, and eight.

5. A valve member according to claim 1, wherein the valve member has at least two internal wall members.

6. A valve member according to claim 1, wherein the valve member has six internal wall members.

7. A valve member according to claim 1, wherein the internal wall members extend to a predetermined height which is at least substantially the same as a predetermined height for the outer wall.

8. A valve member according to claim 1, wherein the internal wall members are symmetrically disposed about a central axis.

9. A valve member according to claim 1, wherein the central member has an internal cavity.

10. A valve member according to claim 9, wherein the internal cavity provides a central member wall thickness.

11. A valve member according to claim 10, wherein the central member wall thickness is about the same as an internal wall member thickness.

12. A valve member according to claim 10, wherein the internal cavity has a substantially cylindrical form.

13. A valve member according to claim 1, wherein the valve member comprises an injection moldable polymer which can be injection molded at a temperature below about 400° C.

14. A valve member according to claim 13, wherein the valve member comprises a polymer selected from the group consisting of polyimide, aromatic polyester, and polyaryletherketone.

15. A valve member according to claim 1, wherein a base member thickness and an outer wall member thickness are substantially the same.

16. A valve member according to claim 15, wherein the base member thickness, the outer wall member thickness, and an internal wall thickness are substantially the same.

17. A valve member according to claim 15, wherein an internal wall thickness is less than the base member thickness and the outer wall member thickness.

18. A valve member according to claim 15, wherein an internal wall thickness is about 60–70% less than the base member thickness and the outer wall member thickness.

19. A valve member according to claim 1, wherein a bottom surface of the base member is substantially flat.

20. A valve member according to claim 1, wherein an outer surface of the first joint region has at least two linear portions designed to rest against a valve seat.

21. A valve member according to claim 20, wherein the valve member is made of an injection-molded thermoplastic polymer selected from the group consisting of polyimide, aromatic polyester, and polyaryletherketone, the polymer having a melting point below about 400° C. which has characteristics suitable for use in a compressor.

22. A compressor comprising a valve member according to claim 1.

23. An article comprising a compressor according to claim 22.

24. An article according to claim 23, wherein the article is a refrigeration unit.

25. A method of making a valve member comprising the step of molding a polymeric resin to form a valve member according to claim 1.

26. A method according to claim 25, further comprising the step of post-annealing the valve member.

27. A method according to claim 26, wherein the polymeric resin is a polymer selected from the group consisting of polyimide, aromatic polyester, and polyaryletherketone.

28. A method according to claim 26, wherein the polymeric resin is thermoplastic resin.

29. A method according to claim 26, wherein the valve member has six internal wall members symmetrically disposed about a central axis.

30. A method according to claim 29, wherein the valve member has a central member which has a cavity.

31. A method according to claim 30 wherein the polymeric resin is a thermoplastic polyimide.

32. A method according to claim 30, wherein the polymeric resin can be molded at temperatures below about 400° C.

33. A method according to claim 26, wherein the valve member is a discharge valve or a suction valve.

34. A method according to claim 25, wherein the method does not include a secondary machining step.

35. A method according to claim 25, wherein the molding step includes compression molding.

36. A valve member according to claim 1, wherein the valve member is fiber reinforced.

37. A valve member for use in a compressor comprising a base member, an outer wall member, and a central member, wherein an internal rib structure joins the base member, the outer wall member, and the central member and the valve member has a uniform base thickness.

38. A valve member according to claim 37, wherein the internal rib structure includes six ribs symmetrically disposed about a central axis, the central axis being perpendicular to the valve member.

39. A valve member according to claim 37 which is prepared with a polymeric resin which can be molded below about 400° C.

40. A valve member according to claim 37, wherein the member also comprises an annular wall having a wall thickness, wherein the wall thickness and the base thickness are substantially the same.

41. A valve member for use in a compressor comprising:
a base member having a top surface and a flat bottom surface, the base member having uniform thickness between the top and bottom surfaces and having a central axis perpendicular to the top and bottom surfaces;
an annular wall member joined to the base member at a first joint region, the annular wall member and the first joint region being centered around the central axis, and the annular wall member extending upward from the base member to a predetermined height with respect to the bottom surface of the base member, the joined base and annular wall members defining an internal space, wherein the first joint region has an outer surface which has at least one linear portion;

a central member joined to the top surface of the base member at a second joint region, the central member and the second joint region being centered around the central axis and the central member perpendicularly extending upward into the internal space to a predetermined height with respect to the bottom surface of the base member, wherein the annular wall predetermined height and the central member predetermined height are about the same, and wherein the central member has a cavity extending toward the base member; and a plurality of internal wall members disposed within the internal space between the central member and the annular wall member and substantially perpendicular to the top surface of the base member, each wall member being joined to the central member, the base member, and the annual wall member to divide the internal space into a plurality of cavities, each of the wall members extending to a predetermined height with respect to the bottom surface of the base member, wherein the predetermined height of the internal wall members is about the same as the predetermined heights of the annular wall and central members, wherein the plurality of internal wall members are symmetrically disposed about the central axis.

* * * * *